United States Patent Office 3,449,247
Patented June 10, 1969

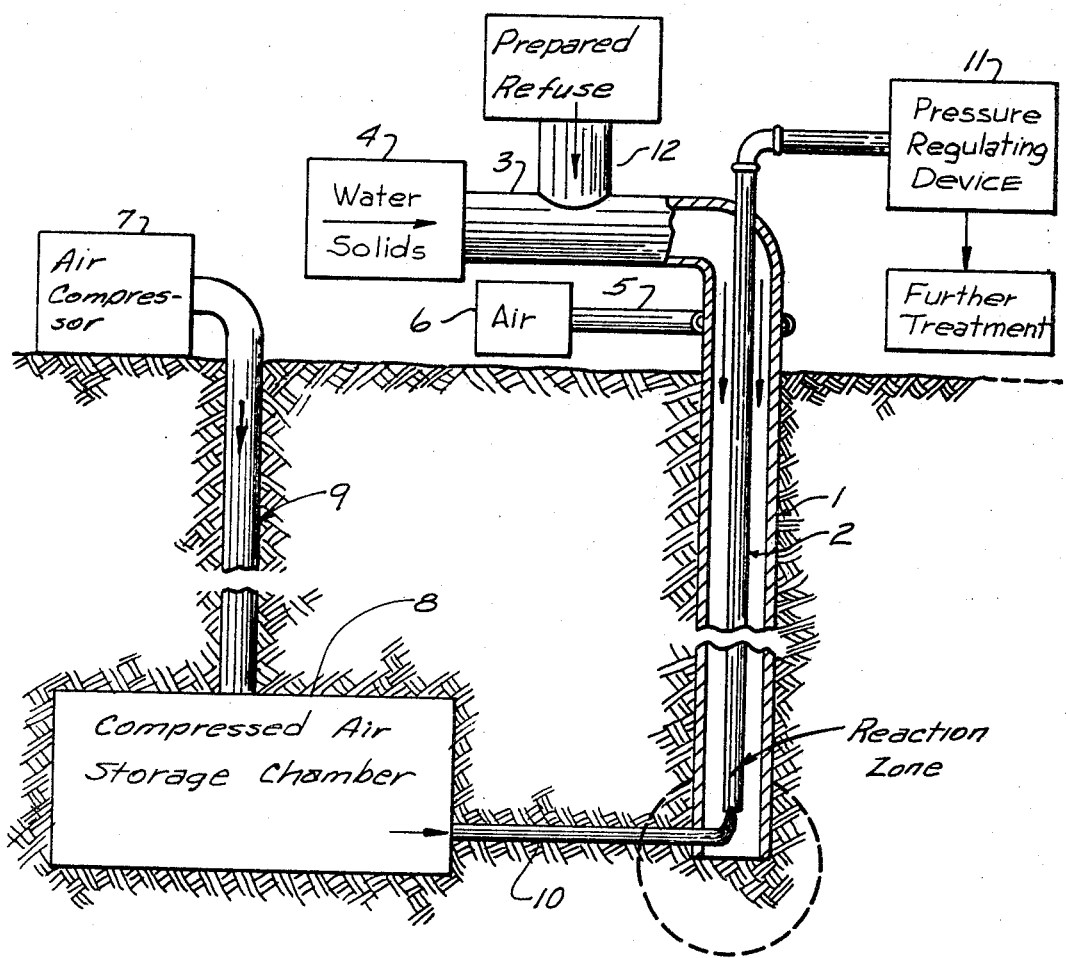

3,449,247
PROCESS FOR WET OXIDATION OF COMBUSTIBLE WASTE MATERIALS
William J. Bauer, 422 S. Park Road,
La Grange, Ill. 60525
Continuation-in-part of application Ser. No. 474,419, July 23, 1965. This application Oct. 23, 1965, Ser. No. 503,973
Int. Cl. C02c 1/00
U.S. Cl. 210—63     7 Claims

ABSTRACT OF THE DISCLOSURE

Wet oxidation of a mixture of combustible refuse and fluid sewage is carried out in the lower portion of a shaft extending into the earth a sufficient distance to provide the desired pressure by the head of fluid material in the shaft.

---

This is a continuation-in-part of my pending application Ser. No. 474,419 filed July 23, 1965, and now abandoned.

This invention pertains to apparatus and processes for wet oxidation of combustible materials, and particularly to improved apparatus and processes for the disposal of organic solids such as plant wastes, sewage sludge, combustible refuse and/or other combustible waste materials in an economical manner by wet oxidation.

A process has been previously proposed for the wet oxidation of combustible materials such as plant wastes and organic sludge resulting from a sewage treatment process; see e.g., U.S. Patent No. 2,665,249 of Frederick J. Zimmermann, dated January 5, 1954, U.S. Patent No. 2,932,613 of H. Huesler et al., dated April 12, 1960, U.S. Patent No. 2,944,396 of D. M. Barton et al., dated July 12, 1960, and U.S. Patent No. 3,060,118 of E. W. Schoeffel, dated Oct. 23, 1962, and see "Wet Air Oxidation" by G. H. Teletzke, Chemical Engineering Progress, January 1964, vol. 60, No. 1, pages 33–38, and "Waste Is For Burning . . . Without Flame-Low Temperature Combustion of Sewage Sludge" of Sterling Drug Inc., Zimmermann Process Division, bearing a date of 1960. Generally, this process involves mixing air, water and combustible materials, raising the pressure and temperature of this mixture sufficiently to cause oxidation of the organic matter in the presence of liquid water, and holding the mixture at the desired temperature and pressure for a sufficient period of time to achieve essentially complete oxidation of the combustible materials. This process may be carried out continuously. Following the oxidation process the resulting mixture (water, gas, ash, etc.) may be passed through further processes to extract heat and power, to separate ash, and to give such additional treatment as may be desired.

High pressures are usually required for the above-noted wet oxidation process, e.g. commonly on the order of 1200–1800 p.s.i. These high pressures have required the use of expensive positive displacement pumps and compressors. The presence of waste materials to be oxidized in the wet mixture passing through the pumps has caused excessive wear and created substantial maintenance problems. This high wear factor and the attendant rapid amortization of this expensive machinery adds substantially to the cost of the process as it is presently undertaken. Additionally the power required for compressing the air used in this process represents a substantial cost factor in the operation of the process.

It is an object of this invention to provide an improved economical system and process for disposing of combustible materials by wet oxidation.

It is a further object of this invention to provide a novel combination and arrangement of apparatus whereby wet oxidation may be carried out under required high pressures with the materials being pumped or otherwise supplied and handled at relatively low pressures; and more particularly to obtain wet oxidation under high pressures with a low pressure supply apparatus.

It is a further object of this invention to provide a process and arrangement of components for economically supplying compressed air in a wet oxidation process.

It is a further object of this invention to provide a process and arrangement of components whereby the temperature of the wet oxidation process is conveniently and economically stabilized.

It is a further object of this invention to provide an improved and economical process and system for the disposal of waste, combustible materials, including sewage and combustible refuse.

It is a further object of this invention to provide an arrangement of apparatus and a process for economically obtaining high pressures in a continuous wet oxidation process whereby the requisite high operating pressures are obtained by means other than high pressure pumps.

Further, and additional objects and advantages of this invention will appear to those skilled in the art from the description, accompanying drawing and appended claims.

In carrying out this ivention in one illustrative form, a first vertical shaft is sunk in the earth to a depth on the order of one mile. This shaft will preferably extend into an impervious rock strata and the shaft may be lined as necessary to form a continuous outer conduit. A second conduit which may be within said outer conduit, communicates with the lower portion of said shaft. The depth of the shaft is sufficient to produce the pressures required for wet oxidation through the action of gravity. An appropriate mixture of air, water and combustible material, which may comprise sewage sludge or sewage liquids enriched by combustible refuse to obtain the requisite proportions of combustible material, or other oxidizable wastes, is directed into said shaft. Air may be introduced into the mixture through the use of blowers at or near the surface entrance to the shaft, whereby the air is introduced under relatively low pressure. The relationship of conduit size and flow rates is such that the velocity of the water mixture downward in the shaft is of sufficient magnitude to carry this air, which may be in the form of bubbles, against the influence of gravity. The entrained air is thus compressed continuously as the mixture of air, water and combustible materials flows downward in the shaft, until sufficient pressure is obtained at the requisite temperature in the lower portion of the shaft for oxidation of the combustible materials to take place. Additional air for the wet oxidation process is initially compressed by a compressor on the surface, at the top of the shaft and is directed downward through a second shaft to the oxidation zone. The weight of the vertical column of compressed air in the second shaft raises the pressure of this air to the pressure of the oxidation zone at the level of introduction of this additional air.

For a more complete understanding of this invention, reference may now be had to the drawing wherein the single figure schematically illustrates an arrangement of apparatus and a flow diagram for one embodiment of the subject invention.

Referring to the drawing, a shaft 1 is sunk into the earth to a vertical depth sufficient to obtain the pressures necessary for carrying out the desired operation by the hydraulic head generated by a column of liquid extending the depth of the shaft. This shaft may be lined with suitable impervious materials, such as stainless steel, if necessary. When passing through impervious strata the lining may be omitted. The shaft will preferably terminate in an impervious strata of rock or other geological material and may be enlarged or belled to provide a reaction chamber of lateral dimensions greater than that of the shaft 1. It will be appreciated that the oxidation reaction will take place over the lower portion of the shaft and not only at one critical level. A return conduit 2 extends into the area of shaft 1 wherein the oxidation reaction is to take place, and this conduit may be disposed within shaft 1, for instance concentrically as illustrated. Conduit 2 may be of suitable materials to withstand the temperatures and abrasive qualities of the materials passing through the shaft and conduit, for instance conduit 2 may be of stainless steel. A mixture of water and solids is admitted to the upper end of shaft 1 through a conduit 3. This material may be supplied to the top of the shaft 1 at a relatively low pressure by a low pressure pump 4. Air may be entrained in the downwardly flowing mixture of water and solids through a conduit 5, by a low pressure blower 6 or the like connected to conduit 5. The column of the resulting mixture in shaft 1 is of sufficient height to create the pressure necessary to obtain wet oxidation of the combustible materials in the lower end portion of the shaft.

An air compressor 7 supplies air under pressure to a storage chamber 8 through a shaft 9. From chamber 8, this air is directed to the oxidation zone within shaft 1 through a conduit 10. It will be appreciated that the air supplied through shaft 9 and conduit 10 will be additionally compressed and raised in pressure by the weight of the air in the vertical column defined by the conduits from the surface to the oxidation zone. Further the amount of the resulting increase in pressure will be dependent upon the density, and thus the pressure, of the air as it is introduced to this column at the surface. The increase of pressure with the descent of the air, is on the order of 3.5% for each 1000 ft. of height, compounded; e.g. approximately 17% for 4500 ft. or 19% for 5000 ft.

The necessary oxygen for the process also may be obtained by injecting oxygen enriched air or pure oxygen at the upper end of shaft 1 and/or at the lower end as through conduit 10.

A regulating device 11, such as a turbine or throttling valve, is connected to the return conduit 2 to control the rate of movement of material through the shaft and conduit and, if desired, to recover energy from the effluent mixture.

The mixture of water and combustible materials, together with any entrained air, or oxygen, flows downwardly in shaft 1 and is raised in temperature as it passes along the conduit 2 by the heat exchange which takes place between the fluid mixture moving down in shaft 1 and the material moving upward in conduit 2. The counterflowing fluids are separated by the wall of conduit 2 which is made of a material, such as stainless steel, to serve as both a fluid barrier and a conductor of heat. In the area at the bottom or lower end portion of the shaft 1 wherein the compressed air is injected, the pressures and temperatures are sufficient to cause wet oxidation to take place.

The reaction zone within shaft 1 normally should be primarily in the return conduit 2 to take advantage of the buoyancy of the resulting heated products in the upward return flow. Accordingly, conduit 10 is illustrated as communicating with the lower end of conduit 2. However, it will be appreciated that the flow of the material in shaft 1 and conduit 2 may be reversed, with the raw materials being supplied through an inner conduit 2, and the end products returning in shaft 1, outside of conduit 2. In the latter arrangement, the compressed air inlet 10 should communicate with the shaft 1 outside of conduit 2.

In starting the process, the oxidation may be initiated by known procedures, such as preheating the input mixture and/or by introducing appropriate combustible materials to the system, or by adding chemicals to create an exothermic reaction and submitting this mixture to the requisite pressures in the system. Subsequently, the heat generated by the combustion or oxidation of the combustible materials is sufficient to maintain the necessary temperature and to render the process continuous, assuming there is an appropriate content of combustible materials in the input mixture, all as is known to those skilled in the art.

The rise in temperature of the materials which takes place as the wet oxidation proceeds causes expansion of entrained and dissolved gases. This expansion, as well as the addition of air in the oxidation zone, contributes to producing a mixture of water and gases which has a lower specific weight than the material flowing down to the reaction zone. This difference in specific weights tends to produce the flow of the material in the desired direction. This flow is also controlled by the input apparatus and the effluent regulating apparatus. The regulating device 11 serves to control the pressures in the shaft 1 and conduit 2 and the rate of movement of material through the system.

The provision of a large storage chamber for the compressed air permits a continuous supply of compressed air to the reaction zone without continuous operation of the compressor(s) 7. Thus, the compressor(s) 7 may be utilized during off-peak periods of utility power companies, and may be shut down during peak demand periods. This makes it possible to obtain the energy to operate the compressors at a lower cost. Further, the increase in pressure obtained by the column of compressed air significantly reduces the compressor requirements. For instance, with an oxidation zone 4500 ft. beneath the surface, to obtain an operating pressure in the oxidation zone of about 1800 p.s.i., the pressure requirement at the compressor(s) 7 will be about 260 p.s.i. less than the required 1800 p.s.i., or about 1560 p.s.i. Since the energy requirement for the compressors normally is a substantial expense of the indicated type of process, such savings in compressor requirements and energy costs represent important economical benefits.

The depth at which the reaction takes place (on the order of one mile below the input end of shaft 1 for about 1800 p.s.i.) is sufficient in most locations to be in a massive rock or similar formations. This formation will be heated adjacent the reaction zone and once heated will tend to stabilize the operating temperatures over long periods of time due to a tendency to return heat to the system should the reaction temperature of the mixture tend to decrease for any reason, such as a decrease in the combustible material content of the mixture. The presence of this large mass of heated material surrounding the reaction zone thus will tend to stabilize the process and render it less sensitive to the fuel content of the mixture being processed.

The storage chamber for the compressed gas may be a large underground chamber, to obtain inexpensive storage. For instance a suitable chamber 8 may be excavated in an impervious strata such as an appropriate rock formation.

Many waste products, such as the effluent of a municipal sewage collection system, and plant wastes, do not contain a sufficient proportion of combustible materials to sustain a wet oxidation process. Thus, many such materials must be concentrated, or the fuel content of the mixture otherwise increased to the necessary level, before submission of the mixture to the wet oxidation process. It is one facet of this invention that municipal refuse, which is commonly made up principally of paper, may be suitably prepared and included as an additive to increase the fuel content of the air-water-combustible mixture being fed to the reaction zone. This material may be added through an input connection 12. This improvement not only furnishes a new and valuable method for disposing of these ordinary waste products of urban living, but also simplifies the preparation of the air-water-combustibles mixture for the wet oxidation process. By way of illustration, the per capita production of combustible organic waste in common sewage is on the order of 0.5 lb. per day. However, the per capita production of refuse is on the order of 5 lbs. per day, and consists of on the order of 85% combustible materials, such as paper. Thus, on the order of ten times the quantity of combustible materials is available in the forms of refuse as in sewage. The inclusion of such refuse or a portion thereof in the mixture to be submitted to wet oxidation may be utilized to greatly increase the fuel content of the mixture, thereby decreasing or eliminating the necessity for concentrating the organic waste in the sewage or waste water mixture. At the same time, a considerable quantity of the combustible refuse will be disposed of.

It will be obvious that certain modifications of the specific embodiment disclosed and described herein may be made by those skilled in the art, particularly in light of the teachings herein, without departing from the spirit and scope of this invention.

It will thus be seen that an improved economical process and arrangement of apparatus have been provided for carrying out wet oxidation disposal of organic materials. Low pressure supply apparatus may be utilized for the waste materials, whereby expensive, high pressure equipment, such as pumps have been eliminated. Further, a process and arrangement of apparatus are provided wherein compressed air may be economically supplied in the wet oxidation process. Apparatus for carrying out this invention is simple and economical to construct, maintain and operate. Further the process presents a new and improved economical method for disposing of organic wastes.

While a particular embodiment of this invention is shown and described herein, it will be understood of course, that the invention is not to be limited thereto since many modifications may be made, particularly by those skilled in this art, in light of this disclosure. It is contemplated therefore by the appended claims to cover any such modifications as fall within the true spirit and scope of this invention.

I claim:

1. A process for wet oxidation of combustible waste materials comprising adding combustible refuse to fluid sewage material, flowing said refuse and fluid sewage material downwardly in a shaft extending into the earth a sufficient distance to obtain the desired pressure for wet oxidation by the column of fluid in said shaft, adding air to said refuse and fluid sewage material to form a mixture suitable for wet oxidation, maintaining the desired temperature condition for wet oxidation in the lower portion of said shaft, carrying out wet oxidation of said mixture in said lower portion of said shaft, and removing the products of said wet oxidation.

2. A process as in claim 1 including continuously flowing said mixture into said shaft and continuously removing said products.

3. A process for wet oxidation of combustible refuse and sewage materials comprising adding combustible refuse to fluid sewage material, flowing said refuse and fluid sewage material into a shaft extending into the earth and maintaining a column of such materials in said shaft of sufficient depth to generate thereby, in the lower portion of such shaft, the pressure desired for wet oxidation, adding air to said refuse and fluid sewage material to form a mixture suitable for wet oxidation, maintaining the desired temperature condition for wet oxidation in the lower portion of said shaft, whereby wet oxidation of said mixture occurs in said lower portion of said shaft, and removing the products of said wet oxidation.

4. A process as in claim 3 including heating a large mass of geological strata surrounding the area of oxidation of said materials in said shaft to assist in stabilizing the oxidation process in such shaft.

5. A process as in claim 3 wherein said air is injected into said refuse and fluid sewage in said shaft.

6. The process as in claim 5, including compressing said air adjacent the upper end of said shaft, conducting such compressed air downward to the zone of wet oxidation in said shaft through a conduit, and injecting said air into said mixture in said shaft in the zone where wet oxidation occurs.

7. The process as in claim 6 including intermittently compressing air, storing such compressed air in a chamber, and continuously feeding said compressed air from said chamber to said shaft.

References Cited

UNITED STATES PATENTS

| | | | |
|---|---|---|---|
| 2,584,606 | 2/1952 | Merriam et al. | 166—11 |
| 2,858,891 | 11/1958 | Moll et al. | 166—11 |
| 2,901,043 | 8/1959 | Campion et al. | 166—11 |
| 2,973,812 | 3/1961 | MacSporran | 166—11 |
| 3,026,937 | 3/1962 | Simm | 166—39 |

FOREIGN PATENTS 1,327,422    4/1963    France.

MICHAEL E. ROGERS, *Primary Examiner.*

U.S. Cl. X.R.

110—8; 166—38, 39; 210—170